United States Patent [19]
Syed

[11] Patent Number: 6,046,273
[45] Date of Patent: Apr. 4, 2000

[54] THERMAL STABILITY OF ALPHA-SUBSTITUTED ACRYLATE GRAFT COPOLYMERS

[75] Inventor: Abuzar Syed, Bear, Del.

[73] Assignee: Montell North America Inc., Wilmington, Del.

[21] Appl. No.: 09/032,479

[22] Filed: Feb. 27, 1998

[51] Int. Cl.⁷ .............................. C08L 51/06; C08L 33/12
[52] U.S. Cl. .............................. 525/71; 525/69; 525/240; 525/242; 525/309
[58] Field of Search ................................ 525/71, 69, 309, 525/240, 242

[56] References Cited

U.S. PATENT DOCUMENTS

| | | | |
|---|---|---|---|
| 5,140,074 | 8/1992 | DeNicola et al. | 525/263 |
| 5,212,246 | 5/1993 | Ogale | 525/240 |
| 5,229,456 | 7/1993 | Ilenda et al. | 525/69 |
| 5,302,454 | 4/1994 | Cecchin et al. | 428/402 |
| 5,409,992 | 4/1995 | Eppert | 525/88 |
| 5,411,994 | 5/1995 | Galli et al. | 521/50.5 |

FOREIGN PATENT DOCUMENTS

| | | |
|---|---|---|
| 420615 | 4/1991 | European Pat. Off. . |
| 479171 | 4/1992 | European Pat. Off. . |
| 560496 | 9/1993 | European Pat. Off. . |

OTHER PUBLICATIONS

Nishimoto, M. et al., "Miscibility of Polycarbonate With Methyl Methacrylate–based Copolymers", Polymer, 32, 1275 (1991).

*Primary Examiner*—James J. Seidleck
*Assistant Examiner*—Olga Asinovsky

[57] ABSTRACT

The thermal stability of alpha-substituted acrylate graft copolymers can be improved by (a) making a graft copolymer comprising a backbone of a propylene polymer material having graft polymerized thereto monomers comprising (i) a 1–3 C alkyl-substituted acrylic acid and (ii) an ester of a 1–3 C alkyl-substituted acrylic acid, wherein the total amount of polymerized monomers is about 20 to about 240 parts per hundred parts of the propylene polymer material and the amount of (i) is about 1 to about 20%, based on the total weight of monomers, and (b) removing any unreacted grafting monomer from the resulting grafted propylene polymer material, decomposing any unreacted initiator, and deactivating any residual free radicals in the material.

13 Claims, 2 Drawing Sheets

THERMAL STABILITY OF ALPHA-SUBSTITUTED ACRYLATE GRAFT COPOLYMERS

FIELD OF THE INVENTION

This invention relates to a process for making graft copolymers of a propylene polymer material and a polymerizable alpha-substituted acrylate monomer.

BACKGROUND OF THE INVENTION

Alpha-substituted polymers such as methacrylates, methacrylonitriles, and α-methylstyrene are thermally unstable and are known to depolymerize to their corresponding monomers at temperatures greater than 230° C. Above 300° C., poly(methyl methacrylate) (PMMA) depolymerizes rapidly at high conversions (>95%). Typical extruding and molding temperatures for such polymers are 200°–250° C. Significant depolarization to the respective monomers would occur in this temperature range, affecting the safety of the operation as well as the properties of the product. Polymethacrylates, and in particular PMMA, are the alpha-substituted polymers most widely used in commercial applications. In order to broaden the range of applications for these polymers it is critical to improve their thermal stability.

In the manufacture of graft copolymers comprising a backbone of a propylene polymer material, to which is grafted poly(methyl methacrylate), small amounts of non-methacrylate monomers such as methyl acrylate, butyl acrylate and styrene are typically copolymerized with the methyl methacrylate to improve thermal stability, since polymers of these monomers are much more stable to heat and undergo degradation at relatively higher temperatures. However, addition of these monomers affects the mechanical properties of the graft copolymers as well as the molecular weight and grafting efficiency.

As reported by Nishimoto et al., Polymer, 32, 1275 (1991), methacrylate monomers have been used with methyl methacrylate to improve compatibility with other functional polymers such as polycarbonates, but the authors concluded that they did not improve thermal stability.

Thus there is a need for method to increase the thermal stability of graft copolymers that include polymerized alpha-substituted acrylates compared with that achievable with the nonmethacrylate comonomers currently used for this purpose.

SUMMARY OF THE INVENTION

The method of this invention for improving the thermal stability of alpha-substituted acrylate graft copolymers comprises:

(a) making a graft copolymers comprising a backbone of a propylene polymer material having graft polymerized thereto monomers comprising (i) a 1–3 C alkyl-substituted acrylic acid and (ii) an ester of a 1–3 C alkyl-substituted acrylic acid, wherein the total amount of polymerized monomers is about 20 to about 240 parts per hundred parts of the propylene polymer material and the amount of (i) is about 1% to about 20%, based on the total weight of the monomers, and (b) removing any unreacted grafting monomer from the resulting grafted propylene polymer material, decomposing any unreacted initiator, and deactivating any residual free radicals in the material.

Copolymerization of a small amount of a 1–3 C alkyl-substituted acrylic acid with the alpha-substituted acrylate during the preparation of graft copolymers of propylene polymer materials significantly increases the thermal stability of the graft copolymer. The room temperature mechanical properties and molecular weight of the graft copolymer, and the grafting efficiency are not adversely affected.

Figure 1:
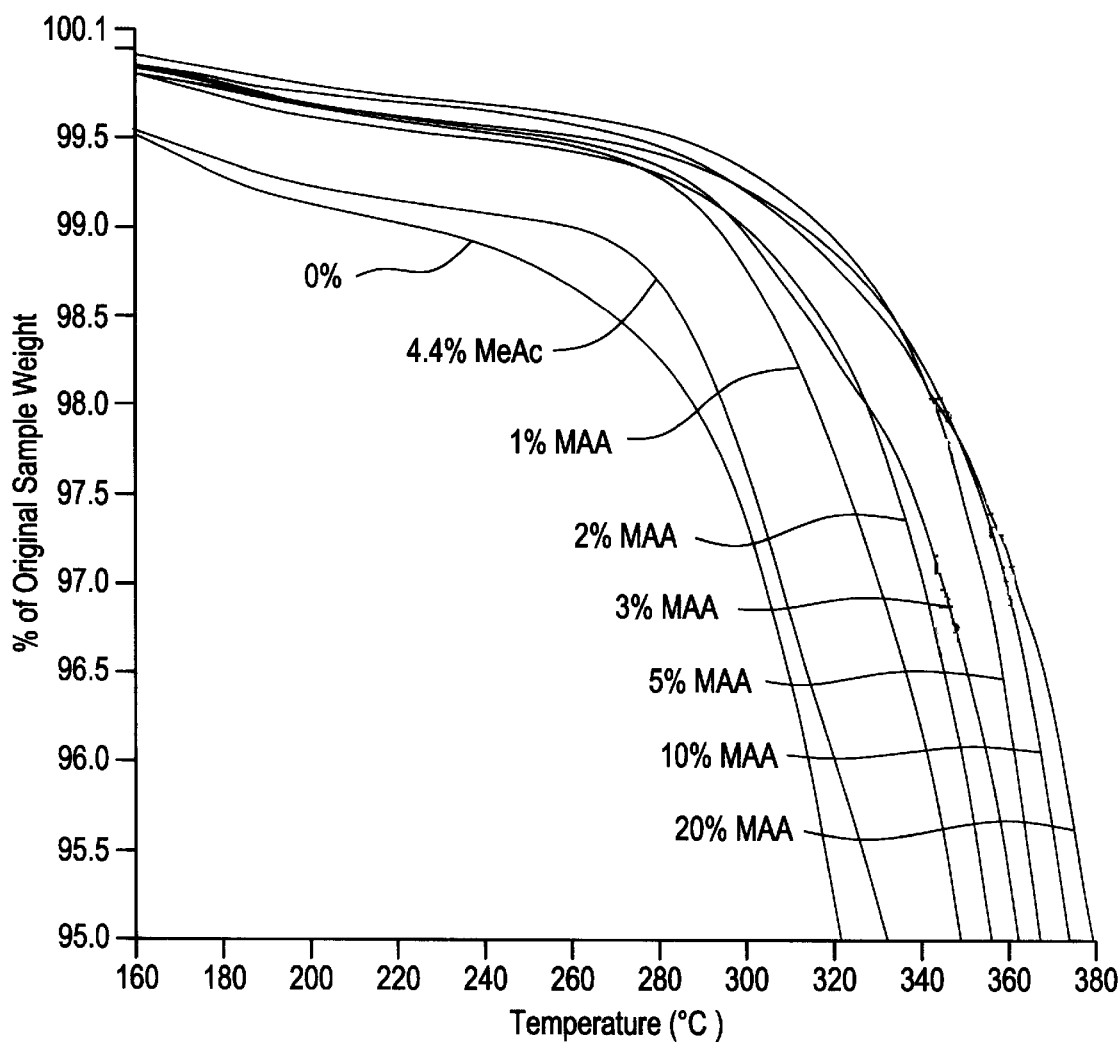
FIG. 1 is a plot of temperature (°C.) against the % of the original weight of the sample and shows the weight loss during thermogravimetric analysis and therefore the thermal stability of graft copolymers comprising a backbone of propylene homopolymer, to which was grafted poly(methyl methacrylate), a methyl methacrylate/methyl acrylate (MeAc) copolymer, and methyl methacrylate/methacrylic acid (MAA) copolymers containing varying amounts of methacrylic acid.

In both figures, sufficient broad molecular weight distribution polypropylene was added to the graft copolymers to adjust the effective add level to 50 parts of polymerized monomers per 100 parts of polypropylene.

DETAILED DESCRIPTION OF THE INVENTION

The first step in the process of this invention for improving the thermal stability of alpha-substituted acrylate graft copolymers is making a graft copolymer comprising a backbone of a propylene polymer material having graft polymerized thereto monomers comprising (i) a 1–3 C alkyl-substituted-acrylic acid and (ii) an ester of a 1–3 C alkyl-substituted acrylic acid.

The propylene polymer material that is used as the backbone of the graft copolymer can be:

(a) a crystalline homopolymer of propylene having an isotactic index greater than 80, preferably about 85 to about 99;

(b) a crystalline copolymer of propylene and an olefin selected from the group consisting of ethylene and 4–10 C alpha-olefins, provided that when the olefin is ethylene, the maximum polymerized ethylene content is 10% by weight, preferably about 4%, and when the olefin is a 4–10 C alpha-olefin, the maximum polymerized content thereof is 20%, preferably about 16%, by weight, the copolymer having an isotactic index greater than 85;

(c) a crystalline terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(d) an olefin polymer composition comprising:
  (i) about 10% to about 60% by weight, preferably about 15% to about 55%, of a crystalline propylene homopolymer having an isotactic index greater than 80, preferably about 85 to about 98, or a crystalline copolymer selected from the group consisting of (a) propylene and ethylene, (b) propylene, ethylene and a 4–8 C alpha-olefin, and (c) propylene and a 4–8 C alpha-olefin, the copolymer having a propylene content of more than 85% by weight, preferably about 90% to about 99%, and an isotactic index greater than 85;

(ii) about 5% to about 25%, preferably about 5% to about 20%, of a copolymer of ethylene and propylene or a 4–8 C alpha-olefin that is insoluble in xylene at ambient temperature, and (iii) about 30% to about 70%, preferably about 20% to about 65%, of an elastomeric copolymer selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene, and containing less than 70% by weight, preferably about 10% to about 60%, most preferably about 12% to about 55%, of ethylene and being soluble in xylene at ambient temperature, and having an intrinsic viscosity of about 1.5 to about 4.0 dl/g, wherein the total amount of (ii) and (iii), based on the total olefin polymer composition, is about 50% to about 90%, the weight ratio of (ii)/(iii) is less than 0.4, preferably 0.1 to 0.3, and the composition is prepared by polymerization in at least two stages, and has a flexural modulus of less than 150 MPa; or (e) a thermoplastic olefin comprising:

(i) about 10% to about 60%, preferably about 20% to about 50%, of a crystalline propylene homopolymer having an isotactic index greater than 80, or a crystalline copolymer selected from the group consisting of (a) ethylene and propylene, (b) ethylene, propylene, and a 4–8 C alpha-olefin, and (c) ethylene and a 4–8 C alpha-olefin, the copolymer having a propylene content greater than 85% and an isotactic index of greater than 85;

(ii) about 20% to about 60%, preferably about 30% to about 50%, of an amorphous copolymer selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene and containing less than 70% ethylene and being soluble to xylene at ambient temperature; and (iii) about 3% to about 40%, preferably about 10% to about 20%, of a copolymer of ethylene and propylene or a 4–8 C alpha-olefin that is insoluble in xylene at ambient temperature, wherein the composition has a flexural modulus of greater than 150 but less than 1200 MPa, preferably about 200 to about 1100 MPa, most preferably about 200 to about 1000 MPa.

Room or ambient temperature is ~25° C.

4–8 C Alpha-olefins useful in the preparation of (d) and (e) include, for example, butene-1; pentene-1; hexene-1; 4-methylpentene-1, and octene-1.

The diene, when present, is typically a butadiene; 1,4-hexadiene; 1,5-hexadiene, or ethylidenenorbornene.

Propylene polymer materials (d) and (e) can be prepared by polymerization in at least two stages, where in the first stage the propylene, propylene and ethylene, propylene and an alpha-olefin, or propylene, ethylene and an alpha-olefin are polymerized to form component (i) of (d) or (e), and in the following stages the mixtures of ethylene and propylene; ethylene and the alpha-olefin, or ethylene, propylene and the alpha-olefin, and optionally a diene, are polymerized to form components (ii) and (iii) of (d) or (e).

The polymerization can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. All gas phase is the preferred method.

The preparation of propylene polymer material (d) is described in more detail in U.S. Pat. Nos. 5,212,246 and 5,409,992, which preparation is incorporated herein by reference. The preparation of propylene polymer material (e) is described in more detail in U.S. Pat. Nos. 5,302,454 and 5,409,992, which preparation is incorporated herein by reference.

Propylene homopolymer is the preferred propylene polymer backbone material.

Figure 2:
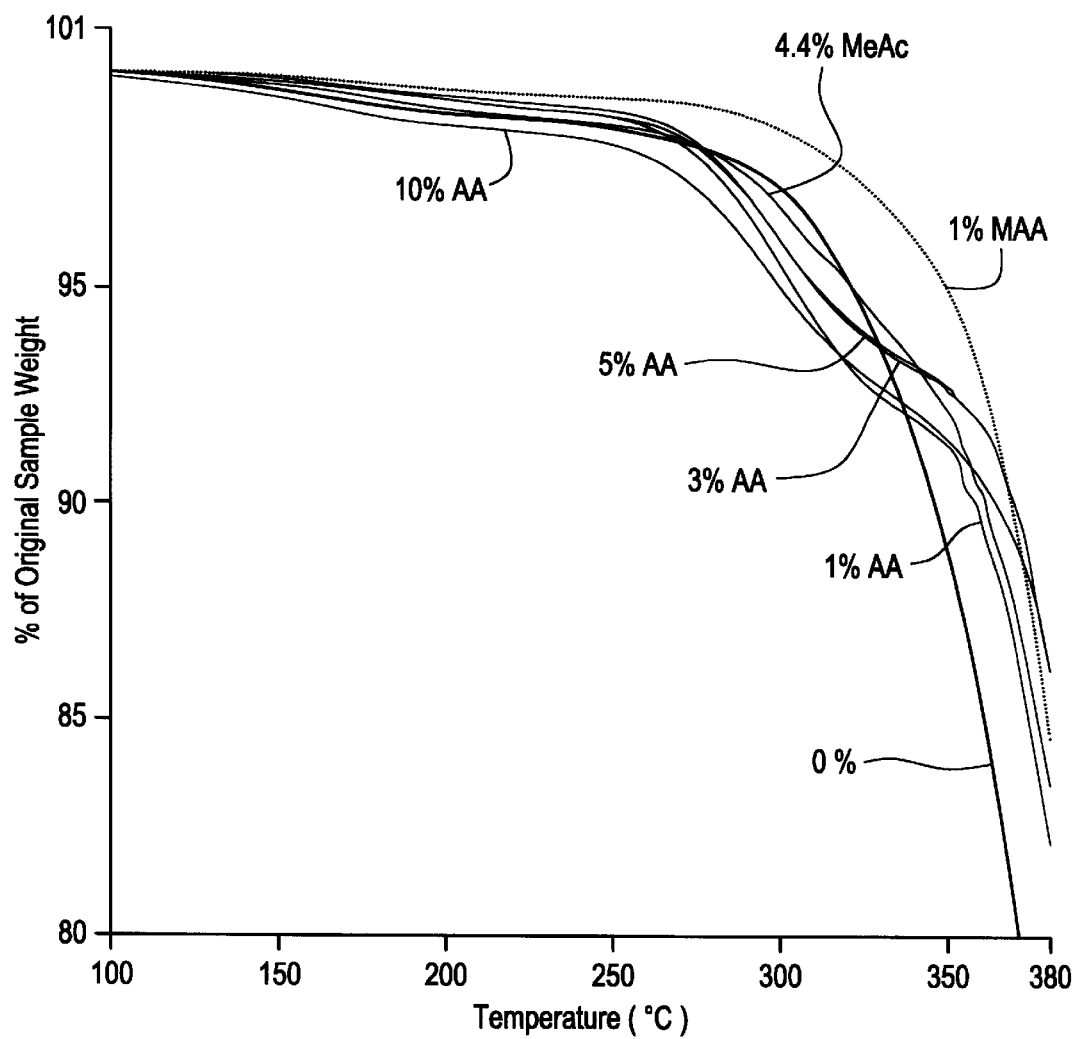
FIG. 2 is a plot of temperature (°C.) against the % of the original weight of the sample and shows the weight loss during thermogravimetric analysis and therefore the thermal stability of graft copolymers comprising a backbone of propylene homopolymer to which was grafted poly(methyl methacrylate), a methyl methacrylate/methacrylic acid (MAA) copolymer, a methyl methacrylate/methyl acrylate (MeAc) copolymer, and methyl methacrylate/acrylic acid (AA) copolymers containing varying amounts of acrylic acid.

One of the monomers that is graft polymerized onto the backbone of propylene polymer material is a 1–3 C alkyl-substituted acrylic acid. Methacrylic acid is the preferred substituted acrylic acid. The amount of substituted acrylic acid is about 1% to about 20%, preferably about 1% to about 10%, and most preferably about 1% to about 5%, based on the total weight of the monomers. Acrylic acid is not effective at similar concentrations (see FIG. 2).

The other monomer that is graft polymerized onto the backbone of propylene polymer material is an ester of a 1–3 C alkyl-substituted acrylic acid. Methacrylic acid is the preferred substituted acrylic acid. Suitable esters include, for example, the methyl, ethyl, butyl, benzyl, phenylethyl, phenoxyethyl, epoxypropyl, and hydroxypropyl esters. Esters of 1–4 C alkanols are preferred. Methyl methacrylate is most preferred.

The total amount of polymerizable monomers is about 20 to about 240 parts, preferably about 30 to about 95 parts, per hundred parts of the propylene polymer material.

The graft copolymer can be made according to any one of various methods. One of these methods involves forming active grafting sites on the propylene polymer material by treatment with a peroxide or other chemical compound that is a free radical polymerization initiator, or by irradiation with high energy ionizing radiation. The free radicals produced in the polymer as a result of the chemical or irradiation treatment form active grafting sites on the polymer and initiate the polymerization of the monomers at these sites. Graft copolymers produced by peroxide-initiated grafting methods are preferred.

During the graft polymerization, the monomers also polymerize to form a certain amount of free or ungrafted polymer or copolymer. The morphology of the graft copolymer is such that the propylene polymer material is the continuous or matrix phase, and the polymerized monomers, both grafted and ungrafted, are a dispersed phase.

The last step of the process of this invention is removing any unreacted grafting monomer from the resulting grafted propylene polymer material, decomposing any unreacted initiator, and deactivating any residual free radicals in the material.

Preparation of graft copolymers by contacting the propylene polymer with a free radical polymerization initiator such as an organic peroxide and a vinyl monomer is described in more detail in U.S. Pat. No. 5,140,074, which preparation is incorporated herein by reference. Preparation of graft copolymers by irradiating an olefin polymer and then treating with a vinyl monomer is described in more detail in U.S. Pat. No. 5,411,994, which preparation is incorporated herein by reference.

Compositions containing the graft copolymers of this invention can easily be impact-modified by the addition of one or more rubber components selected from the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) and (ii), either alone or in combination.

Suitable olefin copolymer rubbers include, for example, saturated olefin copolymer rubbers such as ethylene/propylene monomers rubbers (EPM), ethylene/octene-1, and ethylene/butene-1 rubbers, and unsaturated olefin terpolymer rubbers such as ethylene/propylene/diene monomer rubbers (EPDM). The preferred olefin copolymer rubbers are ethylene/propylene, ethylene/butene-1, and ethylene/octene-1 copolymers.

The monoalkenyl aromatic hydrocarbon-conjugated diene block copolymer can be a thermoplastic elastomer of the A-B (or diblock) structure, the linear A-B-A (or triblock) structure, the radial $(A-B)_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and ratio of monoalkenyl aromatic hydrocarbon to rubber. The block copolymer can also be hydrogenated. Typical monoalkenyl aromatic hydrocarbon monomers are styrene, ring-substituted 1–4 C linear or branched alkyl styrenes, and vinyltoluene. Styrene is preferred. Suitable conjugated dienes include, for example, butadiene and isoprene. Preferred block copolymers are hydrogenated styrene/ethylenebutene/styrene triblock copolymers.

The weight average molecular weight $M_w$ of the block copolymers generally will be in the range of about 45,000 to about 260,000 g/mole, average molecular weights in the range of about 50,000 to about 125,000 g/mole being preferred because they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of crosslinked rubber phase surrounded by a compatibilizing shell, normally a glassy polymer or copolymer. The core is typically a diene rubber such as butadiene or isoprene, or an acrylate. The shell is typically a polymer of two or more monomers selected from styrene, methyl methacrylate, and acrylonitrile. Particularly preferred core-shell rubbers have an acrylate core.

Suitable impact modifiers include, for example, Engage 8100, 8150, and 8200 ethylene/octene-1 copolymers, commercially available from DuPont Dow Elastomers; EPM 306P random ethylene/propylene copolymer, commercially available from Miles Inc., Polysar Rubber Division; Kraton G 1652 styrene/ethylene-butene/styrene triblock copolymer, commercially available from Shell Chemical Company; Exact ethylene/butene-1 copolymers, commercially available from Exxon Chemical Company, and KS080 and KS350 heterophasic polyolefins, commercially available from Montell USA Inc.

The impact modifier, if present, is used in an amount of about 2% to about 30%, preferably about 5% to about 15%, by weight, based on the total weight of the composition.

The composition can also contain a broad molecular weight distribution $(M_w/M_n)$ propylene polymer material (BMWD PP). The BMWD PP has a $M_w/M_n$ of about 5 to about 60, preferably about 5 to about 40; a melt flow rate of about 0.5 to about 50, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on magnesium halide in active form. The polymerization process occurs in separate and consecutive stages, and in each stage polymerization takes place in the presence of the polymer and the catalyst coming from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. No. 5,286,791, which preparation is incorporated herein by reference.

The BMWD PP, if present, is used in an amount of about 5% to about 90%, preferably about 10% to about 70%, base don the total weight of the composition.

Other additives such as fillers and reinforcing agents, e.g., carbon black and glass fibers, as well as inorganic powders such as calcium carbonate, talc, and mica; pigments; slip agents; waxes; oils; antiblocking agents, and antioxidants can also be present.

The test methods used to evaluate the molded specimens were:

| | |
|---|---|
| Izod impact | ASTM D-256A |
| Tensile strength | ASTM D-638-89 |
| Flexural modulus | ASTM D-790-86 |
| Flexural strength | ASTM D-790-86 |
| Elongation to yield | ASTM D-638-89 |
| Elongation to break | ASTM D-638-89 |
| Weldline strength | ASTM D-638-89 |
| Retained weldline strength | Determined by dividing the weldline strength by the tensile strength and multiplying by 100. |
| Meat distortion temperature | ASTM D-648 |
| Melt flow rate, 230° C., 3.8 kg | ASTM 1238 |

The porosity of the propylene homopolymer used as the backbone polymer in the manufacture of the graft copolymers is measured as described in Winslow, N. M. and Shapiro, J. J., "An Instrument for the Measurement of Pore-Size Distribution by Mercury Penetration," ASTM Bull, TP 49, 39–44 (Feb. 1959), and Rootare, H. M., "Review of Mercury Porosimetry," 225–252 (In Hirshhom, J. S. and Roll, K. H., Eds., *Advanced Experimental Techniques in Powder Metallurgy*, Plenum Press, New York, 1970).

In this specification, all parts and percentages are by weight unless otherwise noted.

EXAMPLE 1

This example demonstrates the thermal stability of a graft copolymer comprising a propylene homopolymer backbone, to which was grafted methyl methacrylate/methacrylic acid copolymers (MMA/MAA) with varying amounts of methacrylic acid. The results were compared with the thermal stability of a graft copolymer comprising a propylene homopolymer backbone to which was grafted poly(methyl methacrylate) or a methyl methacrylate/methyl acrylate copolymer (MMA/MeAc).

In this and the following examples the propylene homopolymer used as the backbone polymer had the following properties: spherical form, melt flow rate (MFR) of 9 g/10 min, a porosity of 0.45 cm$^3$/g and a weight average molecular weight ($M_w$) of 170,000.

The monomers were grafted onto the polypropylene backbone at a grafting temperature of 115° C. using the previously described peroxide-initiated graft polymerization process. Ninety-five parts by weight of monomers were added per 100 parts of polypropylene. Lupersol PMS 50% t-butyl peroxy-2-ethyl hexanoate in mineral spirits, commercially available from Elf Atochem, was used as the peroxide initiator. The monomers were fed at a rate of 1 pph/min. A monomer to initiator molar ratio of 120 was used. After the grafting reaction was complete the temperature was raised to 140° C. for 2 hours under a nitrogen purge. The % conversion of monomer to polymer was 97.2–97.7 for the MMA/MAA copolymers and 99.7 for the MMA/MeAc copolymer The graft copolymer (68.4 wt. %) was then blended with 31.6 wt. % of a broad molecular weight distribution polypropylene (BMWD PP) having a polydispersity index of 7.4, a MFR of 1 g/10 min, and a xylene solubles at room temperature of 1.5%, commercially available from Montell USA Inc. The BMWD PP was added to adjust the effective add level to 50 parts of polymerized monomer(s) per hundred parts of polypropylene.

The samples were compounded on a 34 mm co-rotating, intermeshing Leistritz LSM twin screw extruder. Each sample was extruded as pellets at a barrel temperature of 210° C., a screw speed of 300 rpm, and a throughput rate of 20 lb/hr.

The stabilizer package used was 0.1 wt. % calcium stearate and 0.25 wt. % Irganox B215 antioxidant. Irganox B215 antioxidant is a mixture of 1 part Irganox 1010 tetrakis[methylene(3,5-di-t-butyl-4-hydroxyhydrocinnamate)]methane antioxidant, and 2 parts Irgafos 168 tris(2,4-di-t-butylphenyl)phosphite antioxidant, both commercially available from CIBA Specialty Chemicals Corporation.

The thermal stability of the pelletized samples was accessed by thermogravimetric analysis (TGA) using a Perkin-Elmer TGA-7 analyzer. About 10 mg of sample were scanned at 10° C./min in nitrogen from 30° C. to 900° C. and the weight loss was monitored. The region of interest lies between 200° C. and 350° C., where poly(methyl methacrylate) tends to lose weight by depolymerization. The results are shown in Table 1 and FIG. 1.

TABLE 1

| Polymer Composition | Weight Loss at Temperature (°C.) | | | | | |
|---|---|---|---|---|---|---|
| (Wt. %) | 1% | 2% | 3% | 4% | 5% | 10% |
| MMA (100%) | 228 | 289 | 305 | 315 | 322 | 346 |
| MMA/MeAc (4.4%) | 264 | 296 | 309 | 321 | 333 | 360 |
| MMA/MAA (1%) | 294 | 316 | 331 | 343 | 350 | 371 |
| MMA/MAA (2%) | 302 | 329 | 342 | 351 | 357 | 375 |
| MMA/MAA (3%) | 300 | 329 | 346 | 356 | 363 | 381 |
| MMA/MAA (5%) | 320 | 345 | 356 | 363 | 368 | 383 |
| MMA/MAA (1%) | 315 | 347 | 360 | 368 | 374 | NA |
| MMA/MAA (20%) | 313 | 347 | 363 | 373 | 379 | NA |

The data show that the graft copolymers having various levels of methacrylic acid are more stable at a given temperature than the graft copolymers made with 100% MMA or MMA/MeAc (4.4%).

EXAMPLE 2

This example demonstrates the physical properties of a graft copolymer comprising a propylene homopolymer backbone, to which was grafted a methyl methacrylate/methacrylic acid copolymer with varying amounts of methacrylic acid. The results were compared with a control comprising a graft copolymer comprising a propylene homopolymer as the backbone polymer, to which was grafted a MMA/MeAc copolymer containing 4.4% methyl acrylate.

The graft copolymers were prepared as described in Example 1. The graft copolymer (38.6 wt. %) was then blended with 42.9 wt. % of the BMWD PP described in Example 1 to adjust the effective add level to 30 pph of polymerized monomers per hundred parts of polypropylene. Engage 8150 ethylene/octene elastomer containing 25% octene, commercially available from DuPont-Dow Elastomers (14.5 wt. %), was added to the samples. Ampacet 19472 black pigment, commercially available from Ampacet Corporation, was also added in an amount of 2.91 wt. %.

The stabilizer package used was 0.05% Pationic 1240 modified calcium salt of lactic acid, commercially available from Patco Polymer Additives Division, American Ingredients Company; 0.20% of Irganox LC 20 FF stabilizer, a mixture of 1 part Irganox 1010 antioxidant and 1 part Irgafos 12 stabilizer, which is 2,2',2'-nitrilotriethyl-tris[3,3',5',5'-tetra-t-butyl-1,1'-biphenyl-2,2'-diyl]phosphite, both commercially available from CIBA Specialty Chemicals Corporation; 0.30% Tinuvin 328 2-(2-hydroxy-3,5-di-t-amylphenyl)-2H-benzotriazole antioxidant, commercially available from CIBA Specialty Chemicals Corporation; 0.24% Tinuvin 770 bis(2,2,6,6-tetramethyl-4-piperidinyl) sebacate antioxidant, commercially available from CIBA Specialty Chemicals Corporation, and 0.24% Chimmasorb 119 antioxidant, commercially available from CIBA Specialty Chemicals Corporation.

The samples were compounded on a 40 mm co-rotating, intermeshing twin screw Werner & Pfleiderer ZSK extruder. Each sample was extruded as pellets at a barrel temperature of 210° C., a screw speed of 490 rpm, and a throughput rate of 170 lb/hr.

Compounded samples were dried at 80° C. for at least 4 hours prior to molding to remove surface moisture. One inch×⅛ inch test bars were used for all of the physical property measurements. Test bars were produced on a 5 oz Battenfeld injection molding machine at a barrel temperature 450° F. and a mold temperature of 130° F. The results of the property evaluations for each sample are given in Table 2.

not grafted to the polypropylene backbone.

TABLE 2

| Sample | 1 | 2 | 3 | 4 | 5 | 6 | Control |
|---|---|---|---|---|---|---|---|
| MMA/MAA (1%) (wt. %) | 38.6 | | | | | | |
| MMA/MAA (2%) (wt. %) | | 38.6 | | | | | |
| MMA/MAA (3%) (wt. %) | | | 38.6 | | | | |
| MMA/MAA (5%) (wt. %) | | | | 38.6 | | | |
| MMA/MAA (10%) (wt. %) | | | | | 38.6 | | |
| MMA/MAA (20%) (wt. %) | | | | | | 38.6 | |
| MMA/MeAc (4.4%) (wt. %) | | | | | | | 38.6 |
| BMWD PP (wt. %) | 42.9 | 42.9 | 42.9 | 42.9 | 42.9 | 42.9 | 42.9 |
| Engage 8150 (wt. %) | 14.55 | 14.55 | 14.55 | 14.55 | 14.55 | 14.55 | 14.55 |
| Pationic 1240 (wt. %) | 0.05 | 0.05 | 0.05 | 0.05 | 0.05 | 0.05 | 0.05 |
| Irganox LC 20 FF (wt. %) | 0.20 | 0.20 | 0.20 | 0.20 | 0.20 | 0.20 | 0.20 |
| Tinuvin 328 (wt. %) | 0.30 | 0.30 | 0.30 | 0.30 | 0.30 | 0.30 | 0.30 |
| Tinuvin 770 (wt. %) | 0.24 | 0.24 | 0.24 | 0.24 | 0.24 | 0.24 | 0.24 |
| Chimmasorb 119 (wt. %) | 0.24 | 0.24 | 0.24 | 0.24 | 0.24 | 0.24 | 0.24 |
| Black pigment (wt. %) | 2.91 | 2.91 | 2.91 | 2.91 | 2.91 | 2.91 | 2.91 |
| Izod impact (ft. lb/in) | 13.8 | 13 | 12.7 | 13.7 | 13.4 | 8.7 | 13.2 |
| Tensile strength (psi) | 4371 | 4427 | 4354 | 4435 | 4328 | 4320 | 4360 |
| Elongation to yield (%) | 6.12 | 5.9 | 5.9 | 5.7 | 5.7 | 5.6 | 6.23 |
| Elongation to break w/extensometer (%) | 173 | 179 | 185 | 85 | 134 | 187 | 168 |
| Weldline strength (psi) | 3456 | 3482 | 3369 | 3484 | 3417 | 3515 | 3310 |
| Elongation to break @ weldline (%) | 5.5 | 5.5 | 5 | 5.4 | 5.5 | 6.1 | 4.9 |
| Retained strength (%) | 79.1 | 78.7 | 77.4 | 78.6 | 79.0 | 81.4 | 75.9 |
| Flexural modulus @ 0.05"/min (kpsi) | 213.8 | 217.2 | 214.6 | 222.6 | 217.2 | 213.9 | 214.7 |
| Flexural strength @ 0.05"/min (psi) | 6012 | 6117 | 6077 | 6345 | 6191 | 6108 | 6067 |
| H.D.T. @ 66 psi (⅛") (° C.) | 97.6 | 98.2 | 98.2 | 99.4 | 102 | 102 | 92.1 |
| H.D.T. @ 264 psi (⅛") (° C.) | 59 | 59.4 | 59.9 | 60.3 | 59.9 | 59.6 | 59.2 |
| Melt flow rate (3.8 kg @ 230° C.) | 6.4 | 6.4 | 6.2 | 5 | 5.2 | 5.8 | 10.2 |

The data show that all of the graft copolymers containing methacrylic acid as one of the grafting monomers exhibited properties similar to those of the control.

EXAMPLE 3

This example shows the effect of using methacrylic acid as one of the grafting monomers on the molecular properties and grafting efficiency of a graft copolymer comprising a backbone of propylene homopolymer to which was grafted a methyl methacrylate/methacrylic acid copolymer. The results were compared to the properties of a graft copolymer comprising a backbone of propylene homopolymer, to which was grafted poly(methyl methacrylate) or a MMA/MeAc (4.4%) copolymer.

The graft copolymers were prepared as described in Example 1. Weight and number average molecular weights, soluble MMA copolymer (XSRT) and grafting efficiency were measured using a Bio-Rad FTS-7 infrared spectrometer and Perkin-Elmer room temperature gel permeation chromatography (GPC) assembly with a refractive index detector and a tetrahydrofuran mobile phase. It was found that MMA/MAA copolymer grafts were only sparingly soluble in xylene, the solvent normally used for the XSRT measurements, even when only 1% MAA was present in the poly(methyl methacrylate). Cycloheptanone was therefore chosen as the solvent. The total amount of monomers, which is needed for the grafting efficiency calculation, was measured by Fourier transform infrared analysis, assuming the polymer to be 100% poly(methyl methacrylate). This assumption was expected to incur minimal error for copolymers containing less than 5% MAA. The results are given in Table 3.

In Table 3, total pph refers to the total amount of monomer per hundred parts of the propylene homopolymer. $M_w$ and $M_n$ are the weight average and number average molecular weights, respectively, of the polymerized monomers that are

TABLE 3

| MAA in MMA/MAA (wt. %) | Total pph | $M_W$ ($10^3$) | $M_D$ ($10^3$) | XSRT (wt. %) | Grafting Efficiency (%) |
|---|---|---|---|---|---|
| 0 | 41.8 | 264 | 113 | 22.9 | 22.3 |
| 1 | 46.1 | 239 | 104 | 24.0 | 24.5 |
| 2 | 45.6 | 239 | 103 | 21.7 | 30.7 |
| 3 | 45.0 | 227 | 107 | 21.0 | 32.3 |
| 5 | 42.4 | 225 | 80 | 22.5 | 24.4 |
| MMA/MeAc (4.4%) | 50.1 | 124 | 48 | 28.5 | 14.5 |

The data show that addition of MAA does not affect the molecular weight of the ungrafted polymerized monomers, or the grafting efficiency to the same extent that methyl acrylate does. Higher values for molecular weight and grafting efficiency are preferred.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A process for improving the thermal stability of alpha-substituted acrylic acid ester graft copolymers comprising:
   (a) making a graft copolymers comprising a backbone of a propylene polymer material having graft polymerized thereto monomers consisting of (i) an ester of a 1–3 C alkyl-substituted acrylic acid and (ii) a 1–3 C alkyl-substituted acrylic acid as the only comonomer, wherein the total amount of polymerized monomers is about 20 to about 240 parts per hundred parts of the propylene polymer material and the amount of (ii) is about 1% to about 20%, based on the total weight of the monomers, whereby 1% weight loss of the graft copolymer by TGA occurs at a temperature of not less than 290° C., and (b) removing any unreacted grafting monomer from the resulting grafted propylene polymer material, decomposing any unreacted initiator, and deactivating any residual free radicals in the material.

2. The process of claim 1 wherein the propylene polymer material is selected from the group consisting of:

(a) a crystalline homopolymer of propylene having an isotactic index greater than 80;

(b) a crystalline copolymer of propylene and an olefin selected from the group consisting of ethylene and 4–10 C alpha-olefins, provided that when the olefin is ethylene, the maximum polymerized ethylene content is 10% by weight; and when the olefin is a 4–10 C alpha-olefin, the maximum polymerized content thereof is 20% by weight, the copolymer having an isotactic index greater than 85;

(c) a crystalline terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(d) an olefin polymer composition comprising:
  (i) about 10% to about 60% by weight of a crystalline propylene homopolymer having an isotactic index greater than 80, or a crystalline copolymer selected from the group consisting of (a) propylene and ethylene, (b) propylene, ethylene and a 4–8 C alpha-olefin, and (c) propylene and a 4–8 C alpha-olefin, the copolymer having a propylene content of more than 85% by weight and an isotactic index greater than 85;
  (ii) about 5% to about 25% of ethylene and propylene or a 4–8 C alpha-olefin that is insoluble in xylene at ambient temperature, and
  (iii) about 30% to about 70%, of an elastomeric copolymer selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene, and containing less than 70% by weight of ethylene and being soluble in xylene at ambient temperature, and having an intrinsic viscosity of about 1.5 to about 4.0 dl/g, wherein the total amount of (ii) and (iii), based on the total olefin polymer composition, is about 50% to about 90%, the weight ratio of (ii)/(iii) is less than 0.4, preferably 0.1 to 0.3, and the composition is prepared by polymerization in at least two stages, and has a flexural modulus of less than 150 MPa; or (e) a thermoplastic olefin comprising:
  (i) about 10% to about 60% of a crystalline propylene homopolymer having an isotactic index greater than 80, or a crystalline copolymer selected from the group consisting of (a) ethylene and propylene, (b) ethylene, propylene, and a 4–8 C alpha-olefin, and (c) ethylene and a 4–8 C alpha-olefin, the copolymer having a propylene content greater than 85% and an isotactic index of greater than 85;
  (ii) about 20% to about 60% of an amorphous copolymer selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene and containing less than 70% ethylene and being soluble to xylene at ambient temperature; and
  (iii) about 3% to about 40% of a copolymer of ethylene and propylene or a 4–8 C alpha-olefin that is insoluble in xylene at ambient temperature,
wherein the composition has a flexural modulus of greater than 150 but less than 1200 MPa.

3. The process of claim 1 wherein the propylene polymer material is a propylene homopolymer.

4. The process of claim 1 wherein the substituted acrylic acid is methacrylic acid.

5. The process of claim 4 wherein the ester of the substituted acrylic acid is an ester of a 1–4 C alkanol.

6. The process of claim 5 wherein the ester is methyl methacrylate.

7. The process of claim 1 wherein the amount of (a)(i) is about 1% to about 5%.

8. The product prepared by the process of claim 1.

9. A composition comprising the product of claim 8, and about 2% to about 30%, based on the total weight of the composition, of one or more rubber components selected from the group consisting of (a) an olefin copolymer rubber, (b) a monoalkenyl aromatic hydrocarbon-conjugated diene block copolymer, and (c) a core-shell rubber.

10. The composition of claim 9 which further comprises about 5% to about 90%, based on the total weight of the composition, of a broad molecular weight distribution propylene polymer material having a $M_w/M_n$ of about 5 to about 60 and a melt flow rate of about 0.5 to about 50 g/10 min.

11. The product produced by the process of claim 6.

12. A composition comprising the product of claim 11 and about 2% to about 30%, based on the total weight of the composition, of one or more rubber components selected from the group consisting of (a) an olefin copolymer rubber, (b) a monoalkenyl aromatic hydrocarbon-conjugated diene block copolymer, and (c) a core-shell rubber.

13. The composition of claim 12 that further comprises about 5% to about 90%, based on the total weight of the composition, of a broad molecular weight distribution propylene polymer material having a $M_w/M_n$ of about 5 to about 60 and a melt flow rate of about 0.5 to about 50 g/10 min.

* * * * *